US012565966B2

(12) United States Patent
Kampf et al.

(10) Patent No.: US 12,565,966 B2
(45) Date of Patent: Mar. 3, 2026

(54) TANK CONNECTION SYSTEM AND METHOD

(71) Applicant: AMTROL LICENSING INC., West Warwick, RI (US)

(72) Inventors: Christopher Kampf, Moosup, CT (US); Alex Spires, Westerville, OH (US); Jody Mckinley, Mt. Vernon, OH (US); Tim Demos, Wakefield, RI (US)

(73) Assignee: AM, West Warwick, RI (US)

( * ) Notice: Subject to any disclaimer, the term of this patent is extended or adjusted under 35 U.S.C. 154(b) by 146 days.

(21) Appl. No.: 18/517,018

(22) Filed: Nov. 22, 2023

(65) Prior Publication Data

US 2025/0164072 A1 May 22, 2025

(51) Int. Cl.
*F17C 13/08* (2006.01)
*F17C 1/16* (2006.01)

(52) U.S. Cl.
CPC .......... *F17C 1/16* (2013.01); *F17C 2209/232* (2013.01)

(58) Field of Classification Search
CPC . F15B 2201/3151; B65D 90/12; F16M 11/04; F17C 13/084; F17C 13/083; F17C 2205/0126; F17C 2205/0165; F17C 2221/018; F17C 2221/035; F17C 2201/0109; F17C 2201/032
USPC ..... 248/146, 154, 127, 188, 176.1; 220/630, 220/586, 528, 519, 523
See application file for complete search history.

(56) References Cited

U.S. PATENT DOCUMENTS

| | | | | |
|---|---|---|---|---|
| 2,827,195 | A | 3/1958 | Kearns | |
| 4,006,838 | A | 2/1977 | Baumann | |
| D244,578 | S | 6/1977 | Avant | |
| 4,214,611 | A * | 7/1980 | Takacs | F16L 55/053 138/30 |
| D276,889 | S | 12/1984 | Biesecker | |
| D284,033 | S | 5/1986 | Brodsky | |
| D287,335 | S | 12/1986 | Anderson | |

(Continued)

FOREIGN PATENT DOCUMENTS

| | | |
|---|---|---|
| CA | 2518095 | 9/2004 |
| CA | 2584183 | 4/2006 |

(Continued)

OTHER PUBLICATIONS

Coleman Fuel Cylinder found on Jul. 22, 2021 at: https://www.amazon.com/Propane-Fuel-Cylinders-pk-oz/dp/B016YLUXLE/ (Year: 2017).

(Continued)

*Primary Examiner* — King M Chu
(74) *Attorney, Agent, or Firm* — TUCKER ELLIS LLP

(57) ABSTRACT

Provided is a tank including a polymeric upper dome having a neck with a through passage, a polymeric lower dome having a neck with a through passage, a polymeric shell having a first end connected to the upper dome and a second end connected to the lower dome, and a connection attached to each of the upper and lower domes in the through passages of the necks, wherein the upper dome, lower dome, and shell form a cavity. The tank includes at least one stop feature to prevent overtightening of an attachment to the tank, at least one feature to prevent loosening of the attachment from the tank, and a feature to prevent a diaphragm from sticking to the inside of the tank walls.

19 Claims, 12 Drawing Sheets

(56) References Cited

U.S. PATENT DOCUMENTS

| | | | | |
|---|---|---|---|---|
| 4,637,435 | A | 1/1987 | Chirdon | |
| D295,886 | S | 5/1988 | Dolton | |
| D306,639 | S | 3/1990 | Wills | |
| D335,744 | S | 5/1993 | Small | |
| 5,780,130 | A | 7/1998 | Hansen | |
| 5,829,614 | A | 11/1998 | Collette | |
| 6,103,280 | A | 8/2000 | Molzahn | |
| D537,977 | S | 3/2007 | Chen | |
| D621,471 | S | 8/2010 | Bock | |
| D667,130 | S | 9/2012 | Baker | |
| D700,948 | S | 3/2014 | Mcgiveron | |
| D746,942 | S | 1/2016 | Koppert | |
| 9,528,659 | B2 | 12/2016 | Manser | |
| 9,751,689 | B2 * | 9/2017 | DiNovo | B65D 90/041 |
| D912,199 | S | 3/2021 | Aguiar | |
| D923,136 | S | 6/2021 | Kaplan | |
| 2006/0000839 | A1 | 1/2006 | Gremour et al. | |
| 2009/0266816 | A1 | 10/2009 | Holroyd | |
| 2013/0082074 | A1 | 4/2013 | Armstrong | |
| 2018/0080607 | A1 | 3/2018 | Van Haaren | |
| 2018/0162081 | A1 * | 6/2018 | Kloft | F15B 1/165 |

FOREIGN PATENT DOCUMENTS

| | | | |
|---|---|---|---|
| CN | 303618441 | 3/2016 | |
| CN | 303900716 | 10/2016 | |
| WO | WO-2006044331 A2 * | 4/2006 | F24D 3/1041 |

OTHER PUBLICATIONS

PCT/US2020/061790; Notification of Transmittal of the Intl. Search Report and the Written Opinion of the Intl. Searching Authority; 14 pgs. mailed Mar. 15, 2021.

* cited by examiner

TANK CONNECTION SYSTEM AND METHOD

TECHNICAL FIELD

In general, the present invention relates to a tank system, and in particular, various improvements to tank system and its components.

BACKGROUND OF THE INVENTION

Many well and expansion tanks use a diaphragm or bladder to separate air from water. An air charge pressure on one side keeps the diaphragm/bladder at a distance away from the inside wall of the tank in the air dome. When the tank is installed onto a water system, the water system pressure pushes back against the diaphragm/bladder, compressing the air. One type of such tank is a Type IV fiberwound tank. The industry defines this tank as having a plastic liner with fiberwinding around the liner.

SUMMARY OF THE INVENTION

In accordance with an embodiment of the present application, a tank assembly is provided that includes a tank comprising a polymeric body having a first end and second end, a neck proximate the first or the second end of the polymeric body defining a through passage in communication with a cavity of the tank, and a connection attached to the polymeric body in the through passage of the neck, the connection having a through passage extending from a first end to a second end of the connection, the through passage comprising threads along an inner surface thereof for connection of at least one attachment, wherein the connection comprises a radially inwardly extending flange proximate the first end, the flange extending radially inward beyond a surface of the threads, and an attachment connected to the connection, the attachment comprising radially outwardly extending threads to engage the threads of the connection, wherein the attachment further comprises a lip proximate a first end of the attachment, the lip abuts a surface of the flange when the attachment is fully connected to the connection to prevent any further movement of the attachment towards the connection.

In accordance with another embodiment of the present application, the connection comprises a groove proximate the second end of the connection.

In accordance with another embodiment of the present application, a seal is held in the groove of the connection between a surface of the connection and a surface of the attachment.

In accordance with another embodiment of the present application, the attachment comprises an annular groove extending around a perimeter of the first end, the annular groove forming a void between a surface of the attachment and a surface of the connection.

In accordance with another embodiment of the present application, a seal is held in the annular groove of the attachment to form a seal between the attachment and the connection.

In accordance with another embodiment of the present application, the polymeric body comprises a polymeric lower dome, a polymeric upper dome, and a polymeric shell, wherein the polymeric upper dome, the polymeric lower dome, and the polymeric shell define a cavity of the tank.

In accordance with another embodiment of the present application, the tank further comprises a flexible diaphragm disposed in the cavity of the tank, the diaphragm being connected to an inner wall of the polymeric shell.

In accordance with another embodiment of the present application, the polymeric lower dome comprises a plurality of radial ribs configured to mitigate adhesion of the diaphragm to an inner surface of the lower dome.

In accordance with an embodiment of the present application, a tank assembly is provided that includes a tank including a polymeric body defining a cavity and a lower neck defining a through passage in communication with the cavity, a water attachment rotatably attached to the lower neck, and a support stand for supporting the tank and the water attachment is removeably attached to the support stand, wherein the support stand comprises at least two snap features located at a first end of the support stand proximate the lower neck of the polymeric body, the at least two snap features configured to engage a corresponding at least two flats of the polymeric body such that the snap features allow the support stand to rotate about the polymeric body in a first direction, but hinder rotation a second direction.

In accordance with another embodiment of the present application, the support stand is installed to a first end of the polymeric body by rotating the support stand in the first direction to screw the support stand onto the tank.

In accordance with another embodiment of the present application, the water attachment and support stand are installed to a first end of the polymeric body by rotating the support stand in the first direction to screw the support stand onto the tank and to screw the water attachment to the lower neck.

In accordance with another embodiment of the present application, the at least two snap features engage the at least two flats to prevent rotation of the support stand in the second direction with respect to the tank.

In accordance with another embodiment of the present application, the at least two snap features are flexible with respect to the at least to flats when the support stand is rotated in the first direction such that the support stand can be rotated with respect to the tank.

In accordance with another embodiment of the present application, a greater rotational force is required to rotate the support stand in the second direction than the first direction.

In accordance with another embodiment of the present application, the polymeric body includes a polymeric upper dome having an upper neck, a polymeric lower dome having the lower neck, and a polymeric shell having a first end connected to the upper dome and a second end connected to the lower dome.

In accordance with another embodiment of the present application, the tank further comprises a flexible diaphragm disposed in the cavity of the tank, the diaphragm being connected to an inner wall of the polymeric shell.

In accordance with another embodiment of the present application, the polymeric lower dome comprises a plurality of radial ribs configured to mitigate adhesion of the diaphragm to an inner surface of the lower dome.

In accordance with an embodiment of the present application, a tank is provided that includes a polymeric upper dome, a polymeric lower dome including a neck defining a through passage in communication with a cavity of the tank, and a plurality of radial ribs extending around the neck at an inner surface of the lower down, a polymeric shell having a first end connected to the upper dome and a second end connected to the lower dome and forming with the upper and lower dome the cavity, and a flexible diaphragm connected to an inner wall of the polymeric shell in the cavity, the flexible diaphragm expands under pressure toward the radial ribs of the lower dome, wherein the plurality radial ribs are raised with respect to the inner surface of the lower dome and are configured to mitigate adhesion of the flexible diaphragm to the inner surface of the lower dome.

In accordance with another embodiment of the present application, the plurality of radial ribs are evenly spaced and extend outward from a center of the lower dome, the plurality of radial ribs forming a plurality of gaps between the radial ribs.

In accordance with another embodiment of the present application, the polymeric lower dome comprises at least one pass through located between a first and a second radial rib of the plurality of radial ribs, the at least one pass through configured to allow liquid to flow from the through passage of the neck to the cavity of the tank.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
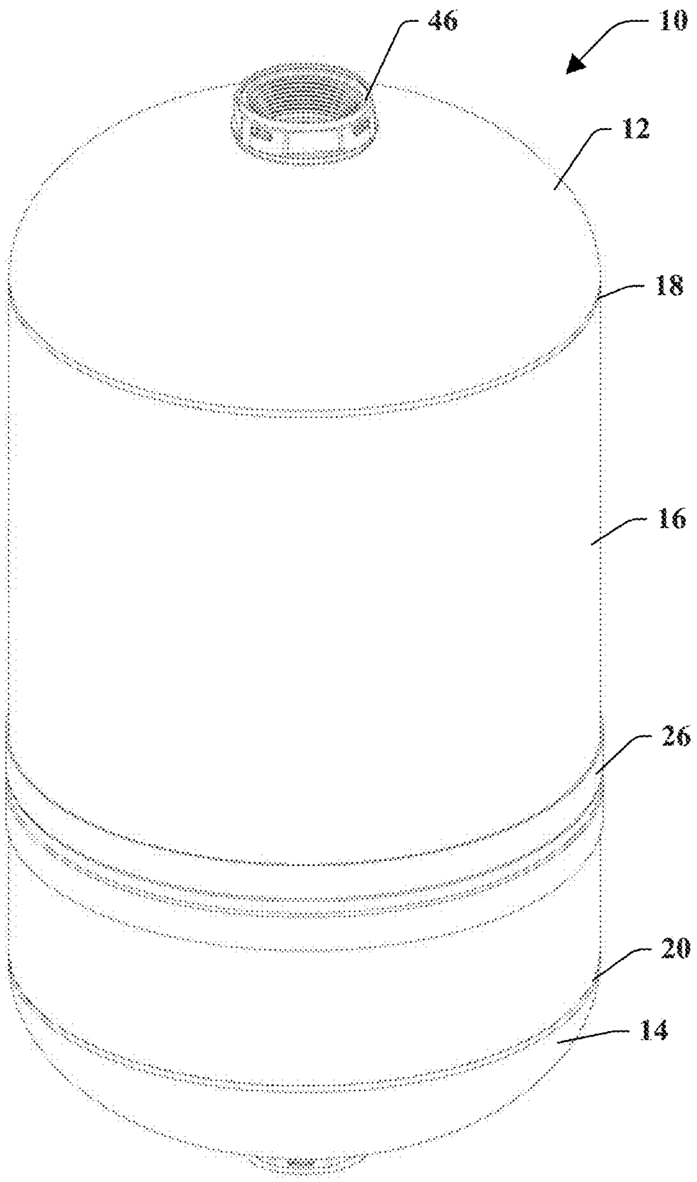
FIG. 1 is a perspective view of an exemplary tank.

Embodiments of the invention relate to methods and systems for a tank that includes a polymeric upper dome having a neck portion, a polymeric lower dome having a neck portion, and a connection attached to each of the upper and lower domes in through passages of the necks, the connections being the same as one another, wherein the upper dome and lower dome form a cavity. The systems and methods described herein can provide an improved connection to a water system, improved diaphragm design, and improved vent design. The benefits of the features and improvements are described in detail herein.

In an example implementation, the tank assembly can include at least one stop feature to prevent over tightening or over-torqueing of the water system connection to the tank. The tank assembly can also include features to lock or secure a tank stand and the water system connection in place to mitigate movement of the connection or stand with respect to the tank. Additionally, the tank can include various features on the inside of the tank wall to prevent a diaphragm of the tank from sticking to the inside of the tank wall. The tank can also include an improved vent or agitator design to provide an efficient flow of liquid to the tank or from the tank.

With reference to the drawings, like reference numerals designate identical or corresponding parts throughout the several views. However, the inclusion of like elements in different views does not mean a given embodiment necessarily includes such elements or that all embodiments of the invention include such elements. The examples and figures are illustrative only and not meant to limit the invention, which is measured by the scope and spirit of the claims.

Figure 2:
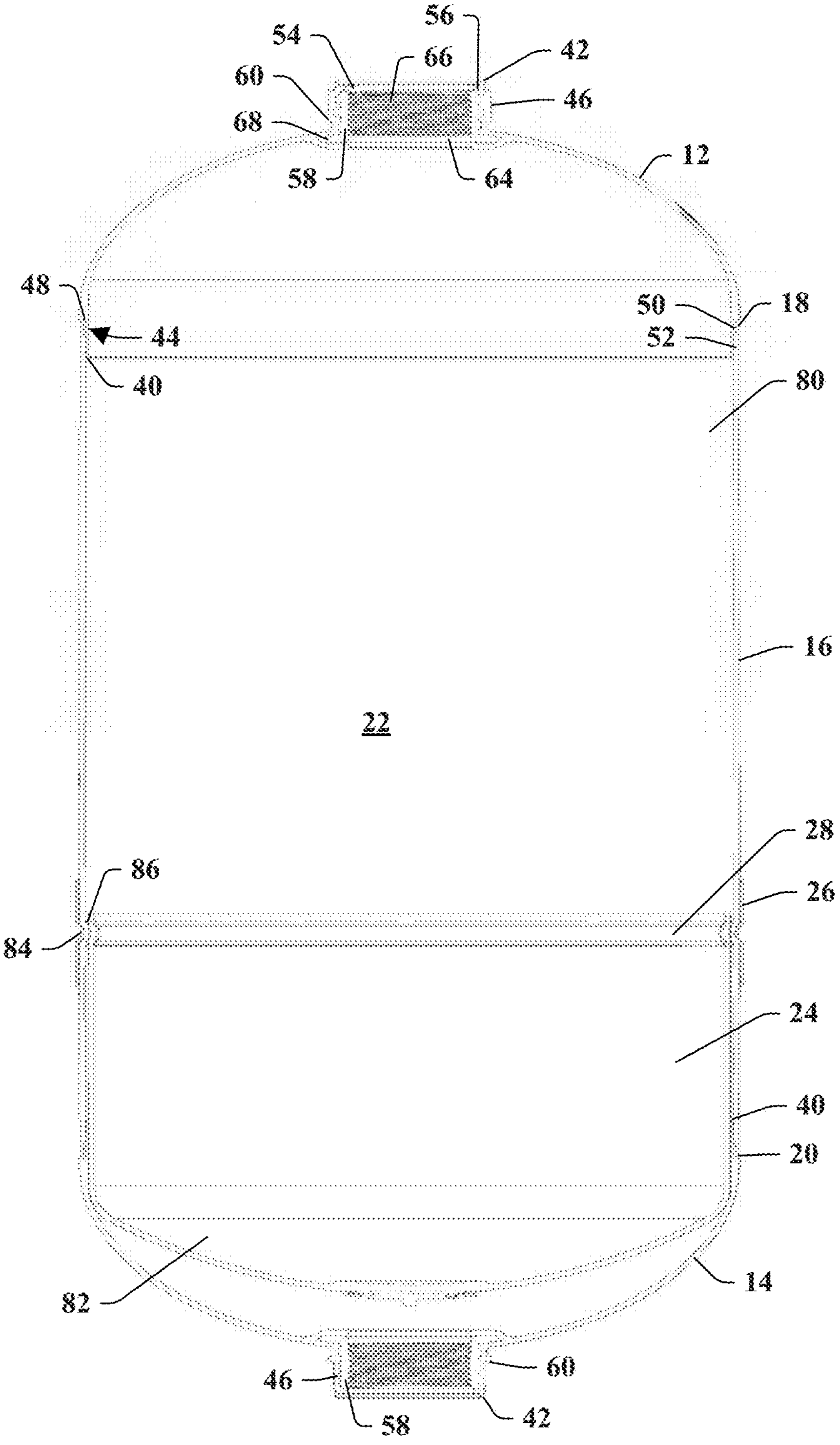
FIG. 2 is a cross-sectional view of the tank.
Figure 3:
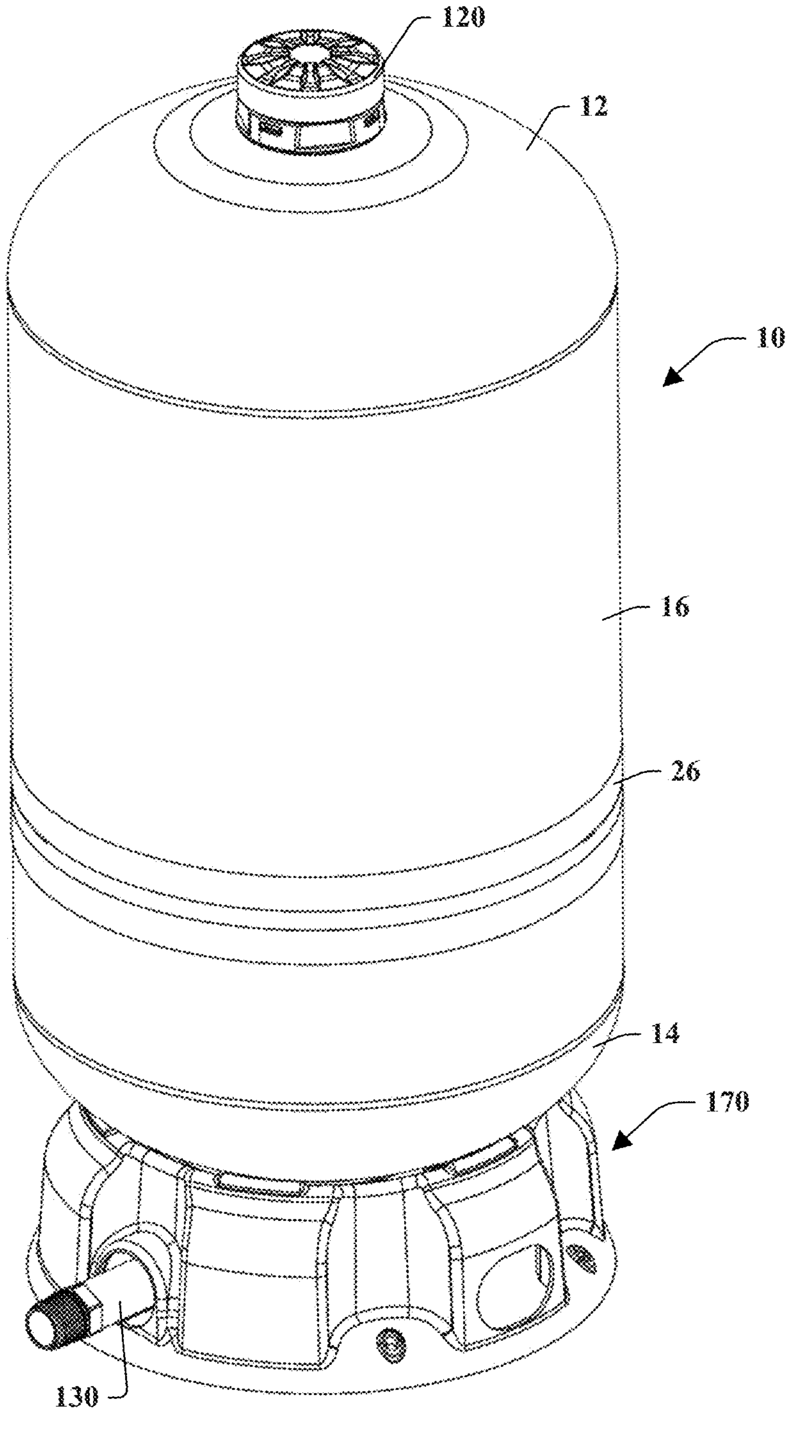
FIG. 3 is a perspective view of an exemplary tank assembly.
Figure 4:
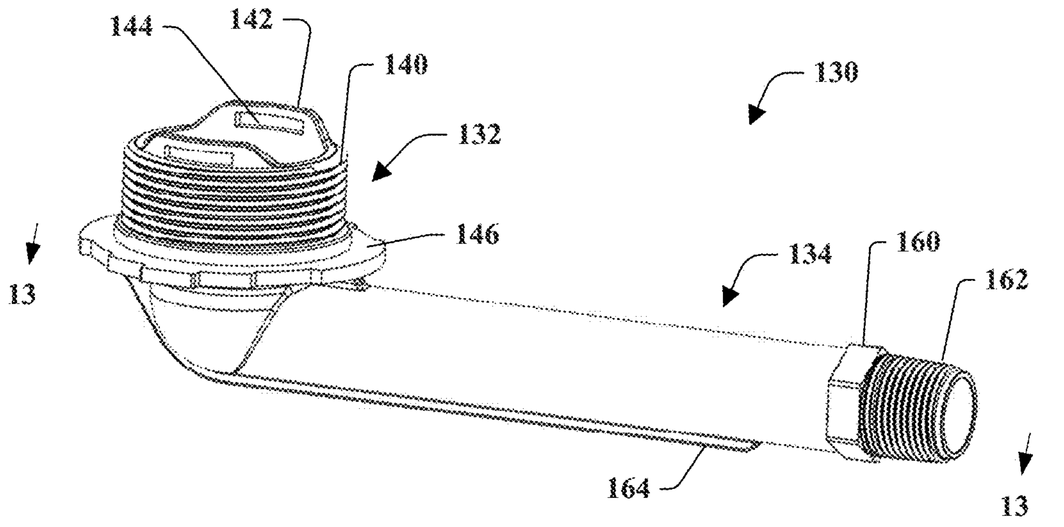
FIG. 4 is a perspective view of a connection configured to attach to the tank.
Figure 5:
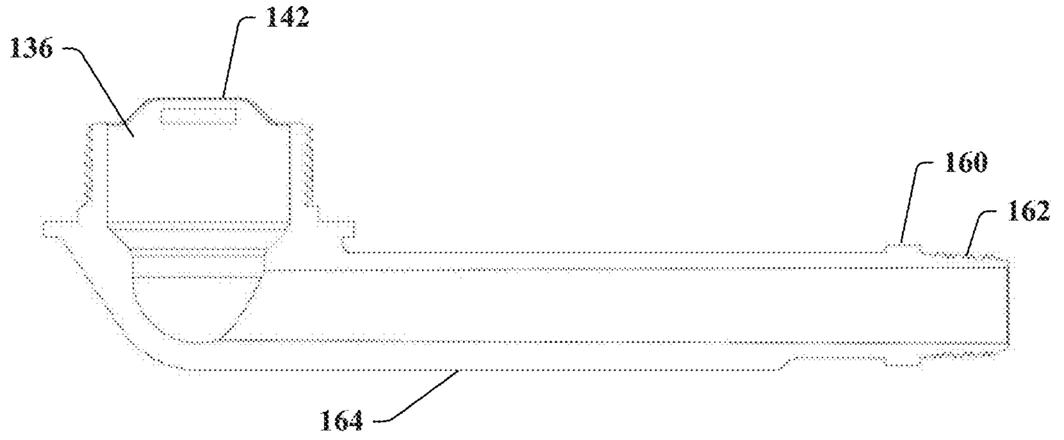
FIG. 5 is a cross-sectional view taken about line 5-5 in FIG. 4.

Turning now to FIGS. 1-3, an exemplary fluid tank is illustrated generally at reference numeral 10. The fluid tank 10 may be a composite tank, such as a Type IV fiberwound tank for use as a well or expansion tank. The fluid tank 10 includes an upper dome 12, a lower dome 14, and a shell 16 having a first end 18 connected to the upper dome 12 and a second end 20 connected to the lower dome. The tank 10 can include a fiberwinding layer, that can, for example, be made of a suitable composite, such as an epoxy glass fiber resin matrix. The upper dome 12, lower dome 14, and shell 16 form a cavity 22 for receiving a diaphragm 24 that is held in position by an outer band 26 and an inner hoop ring 28. The upper and lower domes 12 and 14 and the shell 16 may be made of a suitable material, such as polypropylene, and may be a suitable color, such as black or dark blue to prevent bacteria growth. In an embodiment, the upper and lower domes 12 and 14 may be injection-molded domes made of a polymer, such as a polyolefin, such as a polypropylene copolymer and the shell 16 may be extruded and made of a polymer, such as a polyolefin, such as a polypropylene copolymer. The upper and lower domes may be the same as one another for ease of manufacture.

The neck 46 of each dome 12, 14 defines a through passage 54 into the cavity 22 and includes a radially inwardly extending annular rib 56 serving as a seat for a seal to ensure a seal is made between the neck 46 and a respective connection 58 to prevent leakage, for example from water and/or air. The neck also includes a radially outwardly extending annular rib 60 along its outer surface configured to capture composite material in a manner that will support the connection attached to the neck 46 and keep the connection in position when under high burst pressures. The radially outwardly extending annular ribs 60 each include a plurality of circumferentially spaced flats 62.

The connections 58 are received in the through passage 54 of the respective dome 12, 14 and attached to the respective dome 12, 14 in a suitable manner, such as by insert molding. The connections 58 may be made of a suitable material, such as a polymer, such as a polypropylene copolymer, such as a glass-filled polypropylene. The connections 58 each have a through passage 64 with threads 66 along an inner surface thereof and a flange portion 68 received in a corresponding area in the domes 12 and 14. The threads 66 may be a suitable thread, such as a two and one half inch NPSM thread utilized in the water treatment industry. The connections 58 on the upper and lower domes 12 and 14 can be the same to allow the tank 10 to receive various attachments interchangeably to be used in various industries.

Referring to FIG. 2, the attachment of the diaphragm 24 will be described in detail. The diaphragm 24 may be a flexible diaphragm made of a suitable material, such as butyl rubber, that is positioned within the cavity 22 and connected to an inner diameter surface of the shell 16 to separate the cavity 22 into an upper portion 80 and a lower portion 82. The upper portion 80 is sealed to contain a pressurized gas, for example, and the lower portion 82 is sealed to contain a pressurized fluid, for example. The diaphragm 24 is connected to the shell 16 prior to at least one of the upper and lower domes 12 and 14, and may be positioned and pushed inside the shell 16 to a programmed location by a mandrel. The inner hoop ring 28 is operatively connected to an inner surface of the diaphragm 24 to hold the diaphragm 24 in place against the shell 16. The outer band 26 can be inserted over the shell 16 and grooved such that a hoop groove 84 of the band 26 mates with a hoop groove 86 of the shell 16, and the hoop groove 86 mates with the inner hoop ring 28 to pinch the diaphragm 24 between the hoop groove 86 of the shell 16 and the inner hoop ring 28. It is contemplated that the band 26 and inner hoop ring 28 are made from a metallic material, such as steel. Although described as including the diaphragm 24, it will be appreciated that the tank may be provided without a diaphragm for use in industries such as the water treatment industry.

Turning now to FIGS. 4-7, an exemplary connector 130, such as a threaded elbow connector is configured to be coupled to the connection 58 of the lower dome 14. In certain embodiments, the connector 130 can be referred to as a water connector 130. The connector 130 may be made of a suitable material, such as polyvinyl chloride, and may be made in a suitable manner, such as injection molding. The connector 130 includes an inlet portion 132 and a conduit 134 extending substantially perpendicular to the inlet portion 132. The inlet portion 132 and the conduit 132 each have a respective through passage 136 and 138 fluidly connected to one another to direct flow ninety degrees relative to the connection 58. The inlet portion 132 includes threads 140 along an outer surface for mating with the threads 66 of the connection 58 attached to the lower dome 14, a pair of ears 142 opposite one another extending above the threads 140 and each having an opening 144, and a flange 146 extending outward below the threads 140 for connection to a support stand. The threads 140 may be a suitable thread, such as a two and one half inch NPSM thread utilized in the water treatment industry.

Figure 6:
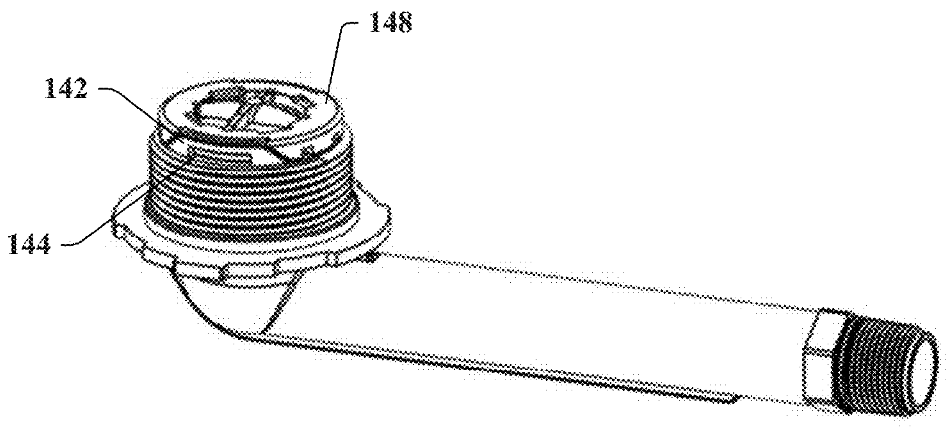
FIG. 6 is a perspective view of the connection with a turbulator.
Figure 7:
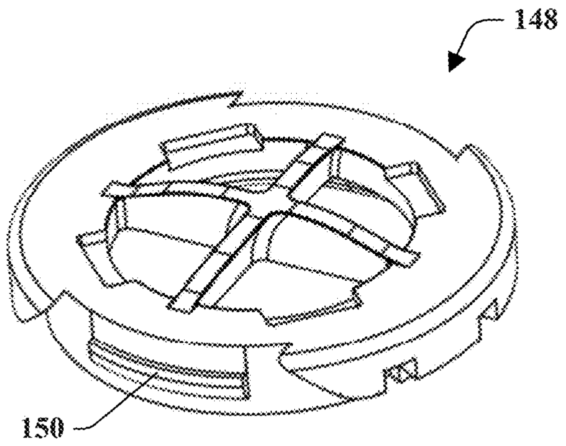
FIG. 7 is a perspective view of the turbulator.

As shown in FIGS. 6 and 7, the ears 142 are configured to connect to a turbulator 148 via protrusions 150 extending outward from the turbulator 148 that are received in the openings 144. It will be appreciated that another suitable connector, such as a support or a diffuser may connect to the ears 142, such as by a snap-in connection. A suitable seal, such as an O-ring can be received on the inlet portion 132 to be received in the seat formed by the rib 56 to seal the inlet portion 132 to the connection 58 and neck 46. If there is a leak between the neck 46 and the connection 58, the leak path would be blocked by the seal 152 to prevent leakage around the connector 130.

Figure 10:
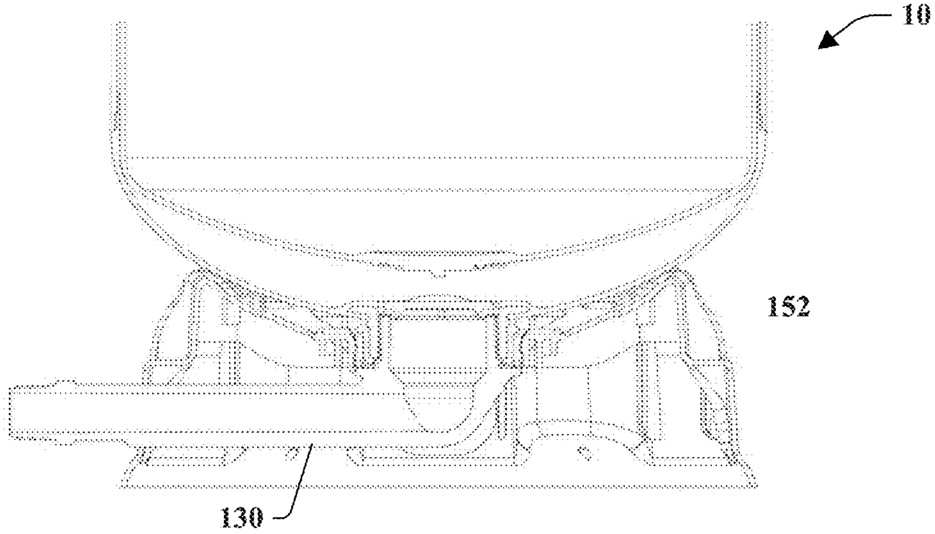
FIG. 10 is a partial cross-sectional view of the tank attached to the support stand and the connection.

Referring now to the conduit 134, the conduit 134 includes a molded-in hex 160 with threads 162 adjacent thereto for connection to another conduit. The threads 162 may be a suitable thread, such as one and one quarter inch NPT threads or one-inch NPT threads. In an embodiment, the hex 160 and threads 162 could be removed by a user, for example cut off by a plumber, and a suitable conduit could be glued to the conduit 134. The length of the conduit 134 is sized such that the conduit can extend through and beyond a sidewall of the support stand a sufficient distance allowing the hex 160 and threads 162 to be removed and the end of the conduit still extend past the sidewall as shown in FIG. 10. The conduit 134 also includes a support rib 164 on an underside thereof configured to bottom out on the support stand when weight is applied to the connector 130 to impeded downward movement of the conduit 134 and transfer stress to the support stand, for example if a user stepped on the conduit 134. As shown, the support rib 164 extends substantially along the length of the conduit 134.

Figure 8:
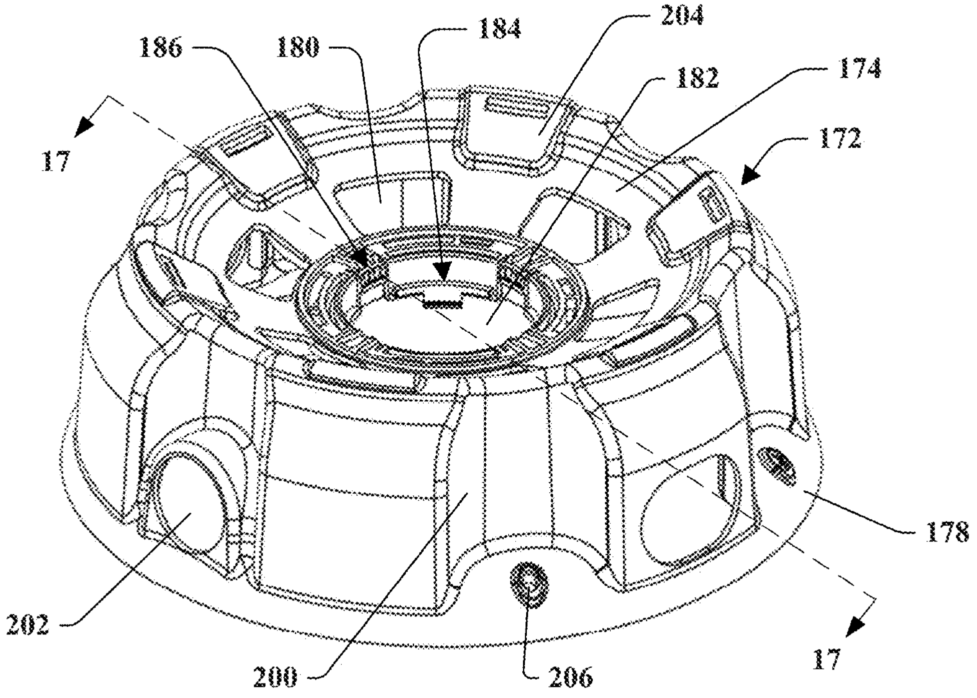
FIG. 8 is a perspective view of a support stand configured to attach to the tank.
Figure 9:
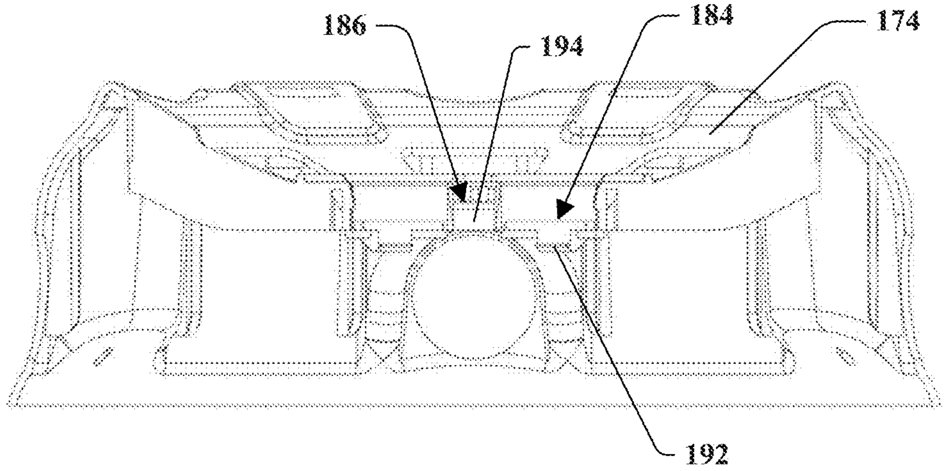
FIG. 9 is a cross-sectional view of the support stand taken about line 9-9 in FIG. 8.

Turning now to FIGS. 8-10, an exemplary support stand for connection to the tank 10 is shown at reference numeral 170. The support stand 170 may be made of any suitable material, such as a polymer, such as a polypropylene copolymer, and made in a suitable manner, such as injection molding. The support stand 170 includes a support body 172 having an upper wall 174, a sidewall 176 extending downwardly from the upper wall 174, and a lower wall 178 extending downward from a lower end of the sidewall 176. A plurality of circumferentially spaced drainage apertures 180 are defined in the upper wall 174 that are adapted to permit airflow and drainage of a liquid through the upper wall 174.

Figure 11:
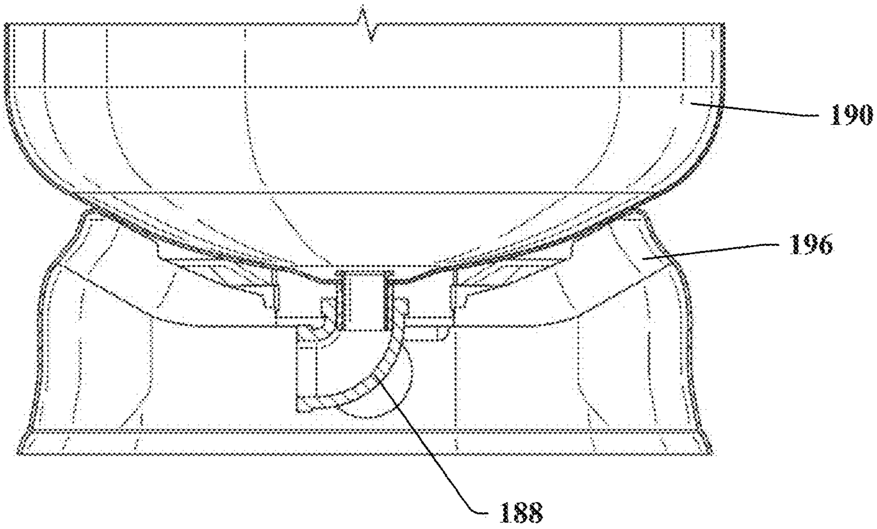
FIG. 11 is a partial cross-sectional view of a metal tank attached to the support stand and a connection.

Also defined in the upper wall 174 is a locking aperture 182 that permits passage of components of the tank 10. As shown in FIG. 9, extending from the locking aperture 182 are first and second attachment mechanisms 184 and 186 for attaching to the connector 130 as shown in FIG. 10 or a connector 188 attached to a metal tank 190 as shown in FIG. 11. The first attachment mechanism 184 includes a plurality of spaced tabs 192 that connect to the flange 146 of the connector 130, for example via snap connection, to secure the connector 130 to the stand to allow the tank 10 to be threadably connected to the connector 130/stand 170 via the connection 58. The second attachment mechanism 186 includes one or more tabs 194 that connect to a ring 196 attached to the tank 190, for example by welding, and then the connector 188 is secured to the ring 196.

The sidewall 176 includes a plurality of circumferentially spaced concave recesses 200 that enhance the rigidity of the support body 172 and provide for increased strength when rolling the tank 10, and a plurality of circumferentially spaced access apertures 202 through which the conduit 134 of the connector 130 may extend. In an embodiment, four access apertures 202 may be provided for utilization in the water treatment industry. The sidewall 176 also includes a plurality of circumferentially spaced standoffs 204 that can alternate with the recesses to facilitate air circulation below the underside of the tank, for example to help prevent buildup of condensation, and a plurality of openings 206 in the lower wall to allow the support stand 170 to be attached a floor or other component as described below.

Figure 12:
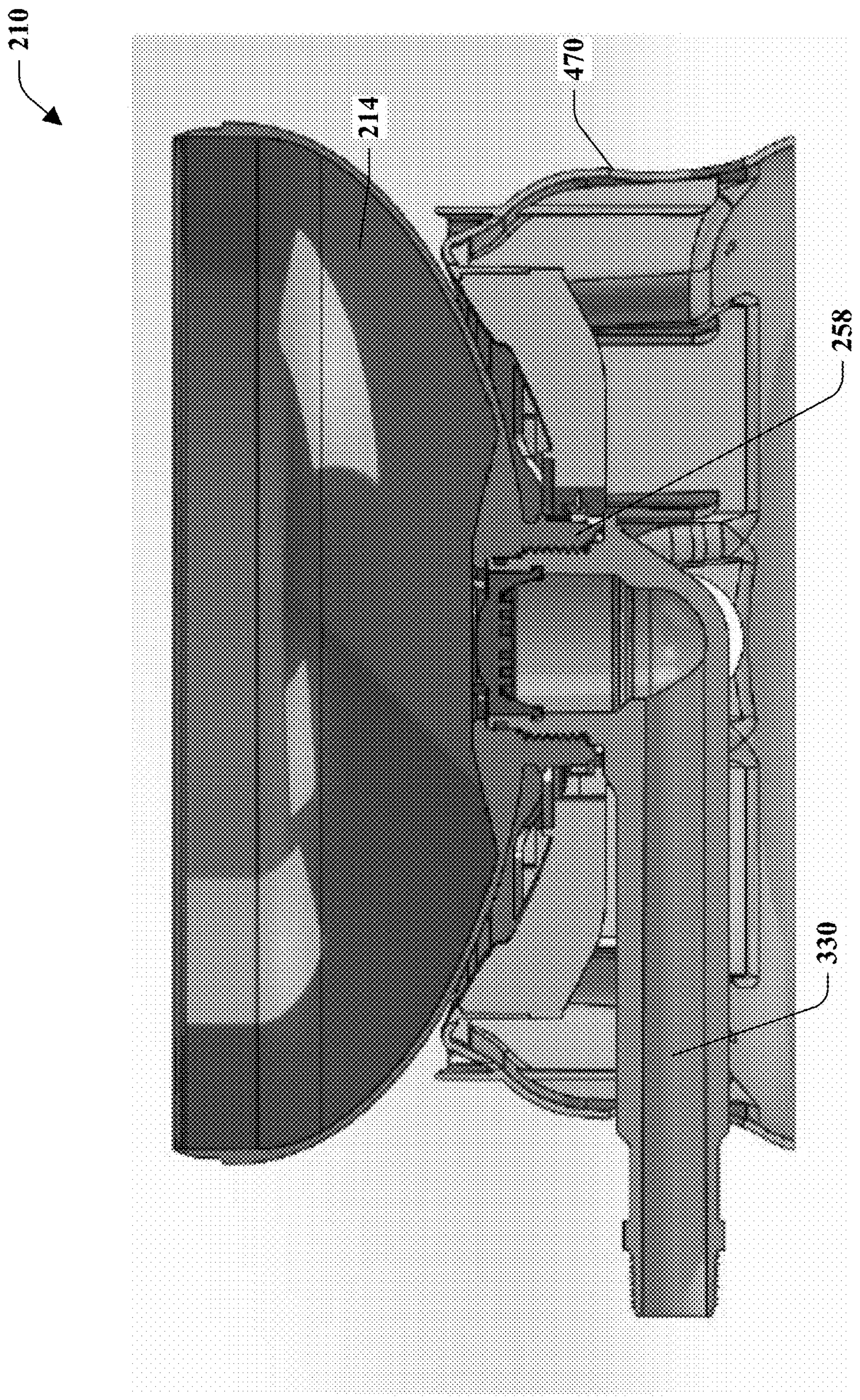
FIG. 12 is partial cross-sectional view of an exemplary tank assembly.
Figure 13:
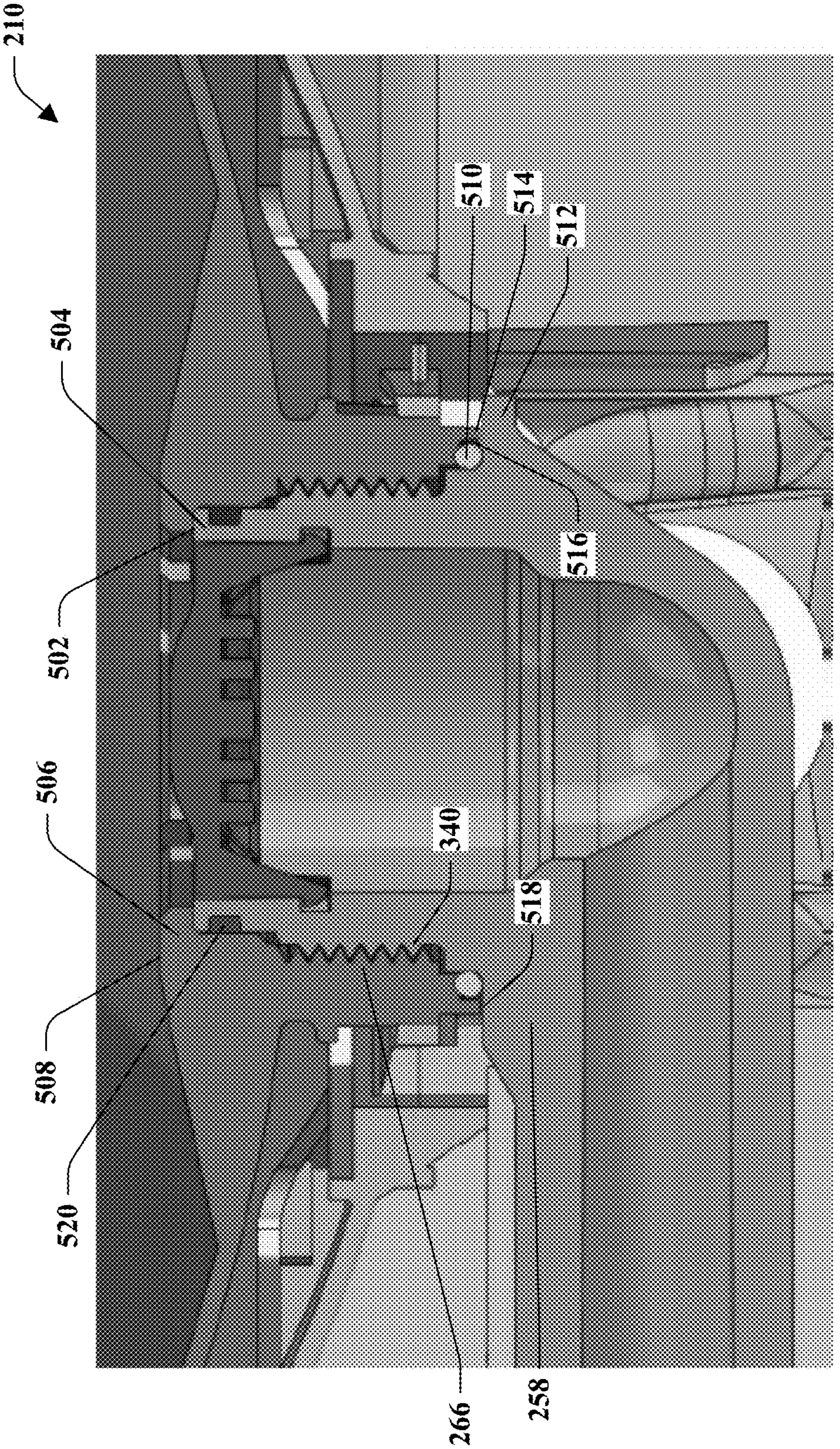
FIG. 13 is another partial cross-sectional view of an exemplary tank assembly.

Turning now to FIGS. 12-13, a tank 210, a dome 214, a connector 330, and a stand 470 are shown. The tank 210, the dome 214, the connector 330, and the stand 470 are substantially the same as the above-referenced tank 10, the dome 14, the connector 130, and the stand 170, and consequently the same reference numerals but indexed accordingly are used to denote similar structures. In addition, the foregoing descriptions of the tank 10 and its components are equally applicable except as noted below.

The tank 210 may include various features to improve the method of attachment between the connector 330 to the connection 258. As described above, the attachment 330 may serve as a water connection for the tank 210. Therefore, the connector 330 may be referred to as a water attachment 330, attachment 330, or a water connection 330. The attachment 330 may be secured into the connection 258 by way of threads 340 and threads 266. In other words, the attachment 330 can be screwed into the connection 258 to secure the attachment 330 to the tank 210. It can be important to maintain a secure connection between the water attachment 330 and the connection 258 of the tank 210 to prevent leaks or malfunctions. For example, issues may arise when the attachment 330 is overtightened or if the attachment 330 becomes lose. In either of these situations, a leak may occur and can cause damage to the tank 210 and its surroundings. Therefore, it is desirable to provide a robust fit between the attachment 330 and the tank 210.

In an embodiment, the tank 210 may include at least one feature to prevent an overtightening or over torqueing of the attachment 330. For example, the attachment 330 can include a lip 504 proximate a first end 502 of the attachment 330. The lip 504 may abut against a flange 506 of the connection 258 when the attachment 330 is fully screwed into the connection 258. The abutment of the lip 504 against the flange 506 may prevent the attachment 330 from being overtightened or over torqued within the connection 258. This can be accomplished by restricting the upward motion of the attachment 330 with respect to the connection 258. Although the example described is with respect to the connection 258 on the lower dome 214, it should be appreciated that the same overtightening or over-torqueing features can be utilized for a connection at the top of the tank 210. In some situations, the features described herein can be utilized for both the upper and lower connections of the tank 210.

In an exemplary embodiment, the flange 506 can be radially and inwardly extending from the connection 258 proximate a first end 508 of the connection 258. In the illustrated embodiment, the flange 506 extends radially inward beyond the surface of the threads 266. In this way, the lip 504 of the attachment 330 abuts the flange 506 when the attachment 330 is fully installed or fully screwed into the connection 258. Fully installed or fully screwed into the connection 258 can refer to a position in which the attachment 330 creates an adequate seal with the connection 258 such that no leaks occur. It can also refer to a condition is which the attachment 330 is torqued to a specific rotational torque and in which the attachment 330 cannot be rotated or tightened further with respect to the tank 210 or connection 258.

To prevent leaks and to ensure a proper seal, the tank 210 can include a first seal 510 received in a groove 516 proximate a second end 514 of the connection 258. The first seal 510 can engage a surface or a radially outwardly extending flange 512 of the attachment 330 to form a seal between the attachment 330 and the connection 258. It should be appreciate that the further the attachment 330 is screwed into the connection 258, the more pressure will be applied to the first seal 510. Therefore, the configuration or spacing of the lip 504 and the flange 506 can determine the maximum pressure applied to the seal 510. In this manner, the lip 504 and the flange 506 can prevent the attachment 330 from being overtightened or from applying more pressure to the first seal 510 than is desired. Preventing overtightening of the attachment 330 can improve the life and functionality of the first seal 510.

It should also be appreciated that, when the attachment 330 is installed to the tank 210, a gap 518 may be observed between the second end 514 of the connection 258 and the flange 512 of the attachment 330. In this regard, the first seal 510 can form a seal between the attachment 330 and the connection 258 even though there may be a gap 518 between the attachment 330 and the connection 258. In some embodiments, it can be desired to maintain a small gap 518 between the attachment 330 and the connection 258 to ensure that proper force is applied to the first seal 510 (e.g., to ensure that a proper seal is formed or that the seal is not deformed or crushed). The lip 504 and the flange 506, collectively referred to as stop features, can be configured to ensure a proper gap 518 is achieved between the attachment 330 and the connection 258. In other embodiments, the lip 504 and the flange 506 can be configured such that the flange 512 of the attachment 330 abuts the second end 514 of the connection 258 and that no gap 518 is present. Configuration of the lip 504 and the flange 506 can ensure that proper force is applied to the first seal 510 and surrounding features. The first seal 510 can be any suitable seal such as a radial seal, an O-ring, gasket, or other seal.

The tank 210 can further include a second seal (not shown) that is received within the groove 520 of the attachment 330. The second seal can engage the connection 258 to provide a seal between the attachment 330 and the connection 258. The second seal can be any suitable seal such as a radial seal, an O-ring, gasket, or other seal.

As illustrated in FIG. 12, the tank 210 can be attached to a stand 470. In some embodiments, the stand 470 is installed on the tank 210 by rotating or screwing the stand 470 onto the tank. Moreover, as described above with respect to the stand 170, the attachment 330 can be attached to the stand 470 such that the stand 470 and attachment 330 can be installed onto the tank 210 simultaneously. Various locking features that can be provided to ensure that the stand 470 and/or the attachment 330 do not rotate (e.g., loosen) with respect to the tank 210.

Figure 14:
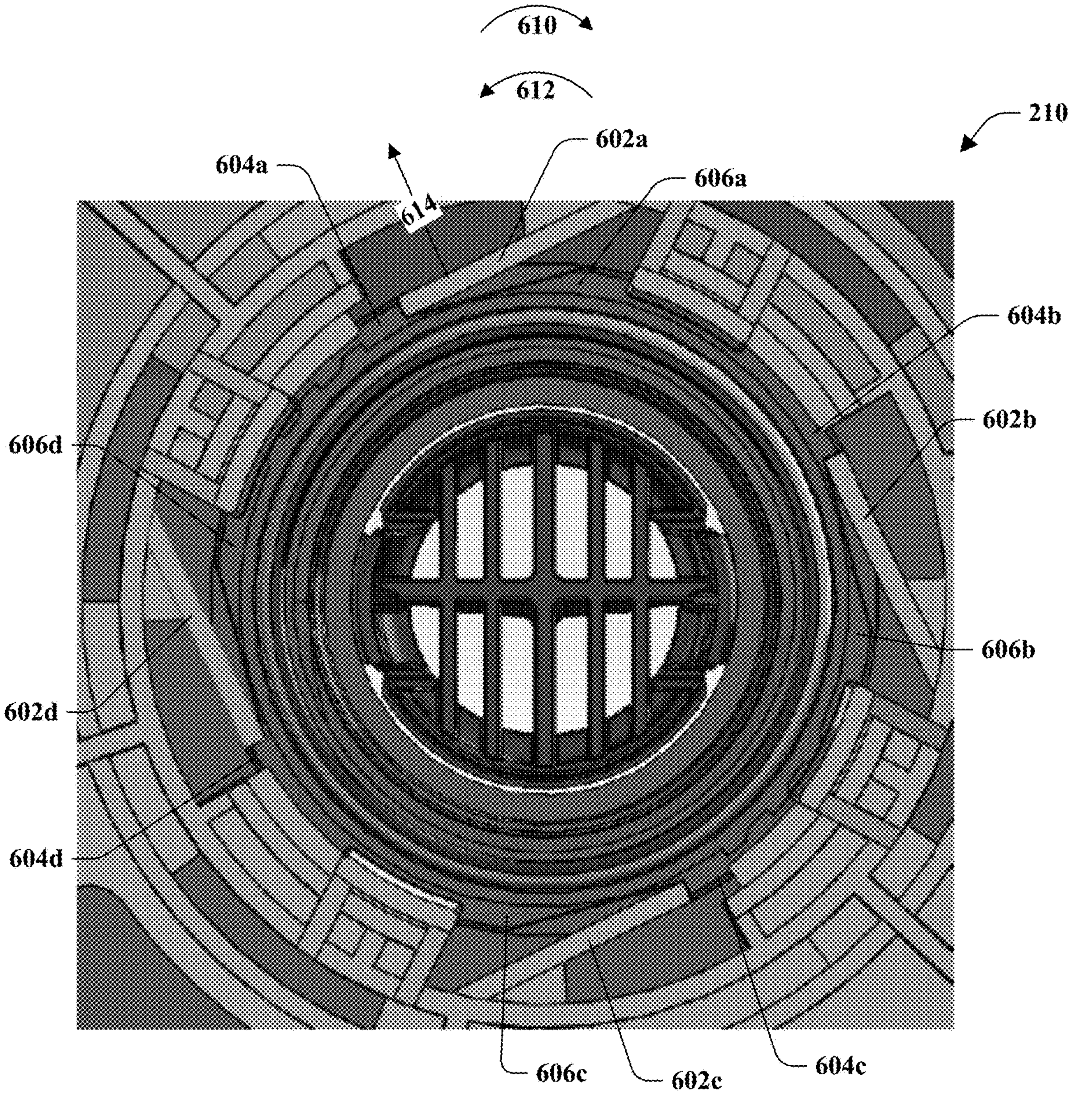
FIG. 14 is another partial cross-sectional view of an exemplary tank assembly.

Turning to FIG. 14, snap features 602*a-d* (sometimes referred to as snap tabs or tabs) are illustrated. The snap features 602*a-d* can be provided as part of the stand 470 geometry. The snap features 602*a-d* can interact with and engage with corresponding flats 604*a-d* of the tank 210. The flats 604*a-d* can be molded into or can be manufactured as a part of the lower dome 214 of the tank 210 or may be attached to the tank 210 in a suitable manner. The snap features 602*a-d* can allow the stand 470 to index around (rotate) the tank 210 in a clockwise manner while the attachment 330 and stand 470 are being tightened into position. The snap features 602*a-d* can make a clicking noise every time they go by the corresponding flats 604*a-d*. It should be appreciated that any number of snap features 602*a-d* or corresponding flats 604*a-d* can be provided.

The snap features 602*a-d* can engage with the corresponding flats 604*a-d* to allow rotation of the tank stand 470 in a first direction 610 (e.g., clockwise) while preventing rotation in a second direction 612 (counterclockwise). Although the example provided herein relates to rotation in the clockwise direction, it should be appreciated that the stand 470 can be configured for counter clockwise rotation if desired. Moreover, once the attachment 330 and the stand 470 have been assembled (rotated) into position, they may only be able to be rotated in the second direction until the snap features 602*a-d* lock into the flats 604*a-d*. There may be a distance between the snap features 602*a-d* and the flats 604*a-d* such that rotation in either direction is possible without interaction between the snap features 602*a-d* and the flats 604*a-d*. For example, depending on the spacing and configurations of the snap features 602*a-d* and the flats 604*a-d*, the stand

470 may be able to be rotated 90 degrees in the second direction before engaging the flats 604*a-d*. This can allow for slight modifications with the rotation, spacing, and installation of the stand 470 or attachment 330 to the tank 210.

Angled ramps 606*a-d* can also be provided to cause the snap features 602*a-d* to flex and snap into place as the stand 470 is rotated in the first direction. The ramps 606*a-d* can be molded into or can be manufactured as a part of the lower dome 214 of the tank 210 or may be attached to the tank 210 in a suitable manner. The ramps 606*a-d* can be angled such that the snap features 602*a-d* engage with the ramps 606*a-d* when the stand 470 is rotated in the first direction. When the snap features 602*a-d* engage the ramps 606*a-d*, the ramps can cause the snap features 602*a-d* to flex in direction 614 so that the stand 470 can be rotated in the first direction. When the snap features 602*a-d* are rotated past the ramps 606*a-d*, the snap features 602*a-d* may return to their original and un-flexed position.

The snap features 602*a-d* can be manufactured of any suitable material such as plastic, polymer, metal, or rubber such that a suitable flex is achieved. For example, a more rigid material can increase the amount of pressure needed to deform the snap features 602*a-d* such that torque required to rotate the stand 470 in the first direction is increased. Nonetheless, the torque required to rotate the stand 470 in the second direction can be substantially higher than the torque required for rotating the stand 470 in the first direction past the flats 604*a-d*. By way of example, it may take one to two (1-2) foot pounds to rotate the stand 470 in the first direction to attach the stand 470 to the tank 210. It may take one hundred (100) foot pounds to rotate the stand 470 in the second direction past the flats 604*a-d* (e.g., to break the snap features 602*a-d* and/or flats 604*a-d*). Said differently, it can require less force to install the tank stand 470 than is required to remove the tank stand 470. Similarly, it can require less force to install the attachment 330 than is required to remove the attachment 330.

Figure 15:
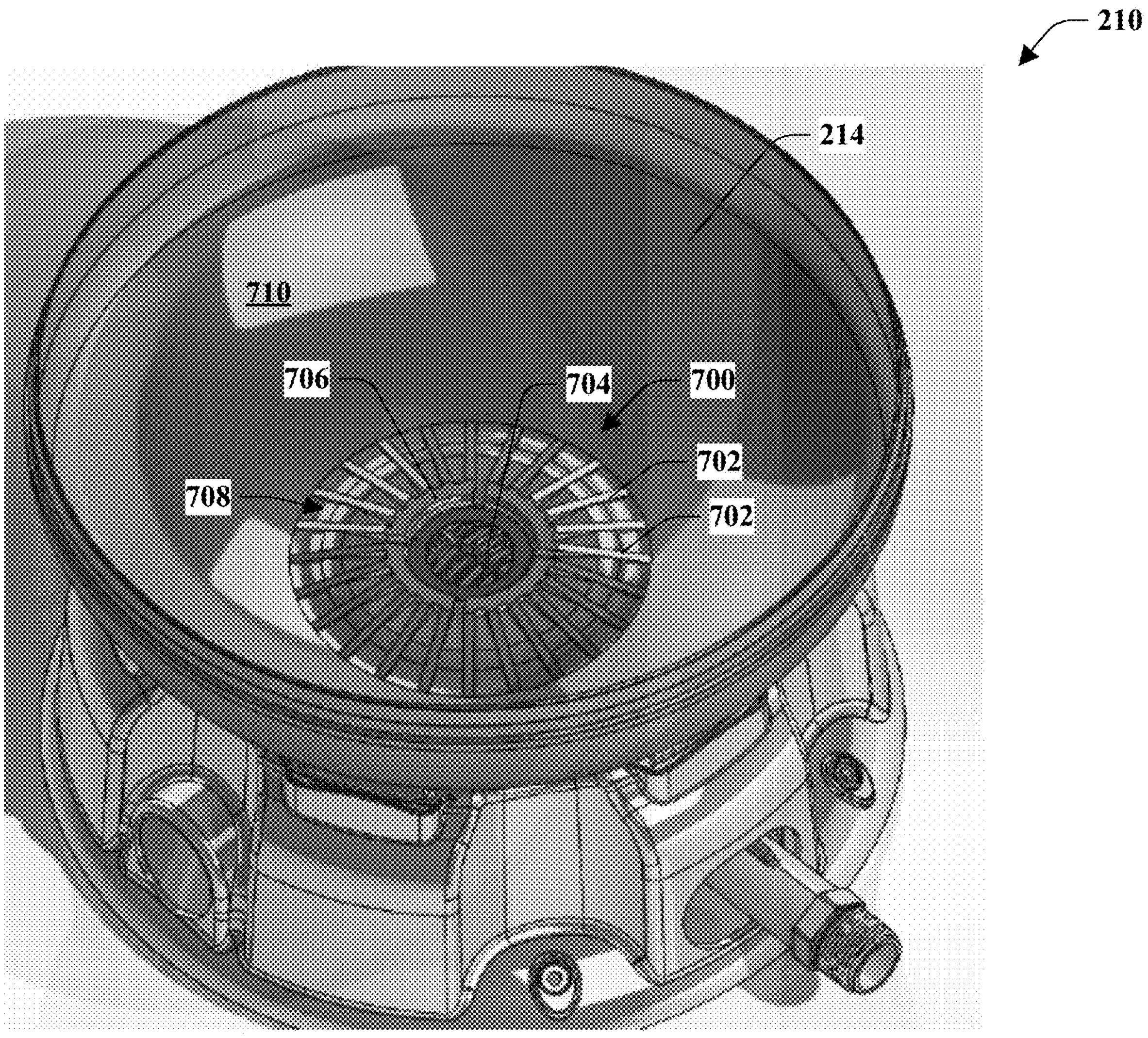
FIG. 15 is a perspective view of a portion of an exemplary tank assembly installed on a support stand.
Figure 16:
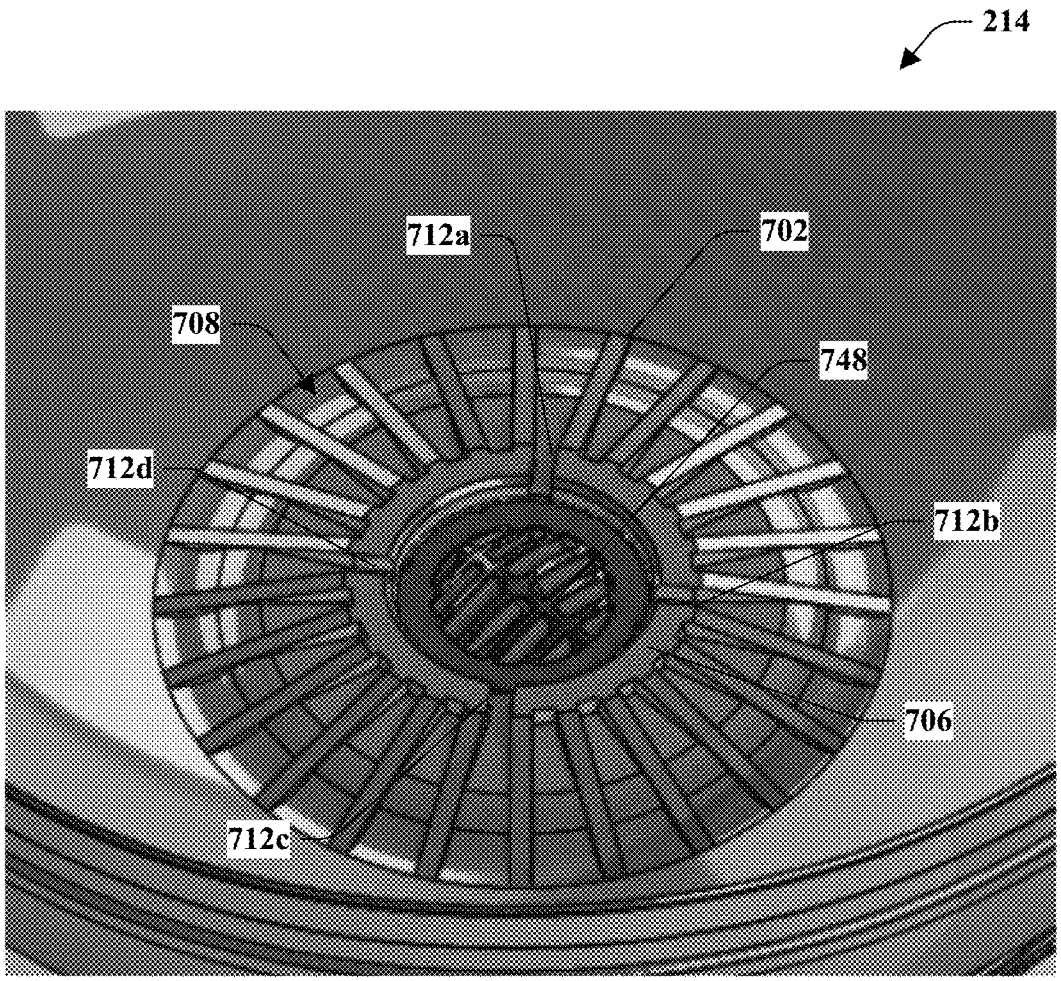
FIG. 16 is a perspective view of a portion of an exemplary tank.

Turning to FIGS. 15-16, perspective views of the tank 210, specifically, the lower dome 214 are shown. As illustrated in the drawings, the lower dome 214 can be provided with radial rib features 700 to mitigate issues with a diaphragm 224 (not shown) of the tank 210. The radial rib features 700 can include a plurality of radial ribs 702, each extending radially outward from the center of the lower dome 214, and being evenly spaced around the outlet 704 of the tank 210. A ring 706 may surround the outlet 704 of the tank 210 such that the plurality of radial ribs 702 extend outward from the ring 706 to a surface of the lower dome 214. It should be appreciated that any suitable number of ribs 702 may be provided such that a suitable gap 708 is maintained between the plurality of ribs 702. In some embodiments, the ring 706 may protrude upward from the bottom surface of the lower dome 214 such that both the ring 706 and the ribs 702 are located above bottom surface of the lower dome 214. In some embodiments, the ribs 702 may extend upward from the lower dome 214 in a concave manner. In other embodiments, the shape of the ribs 702 may be convex or may correspond to the shape of the lower dome 214.

Similar to the diaphragm 24 of the tank 10, the diaphragm of tank 210 may be a flexible diaphragm made of a suitable material, such as butyl rubber, that is positioned within a cavity and connected to an inner diameter surface of a shell to separate the cavity into an upper portion and a lower portion. It should be appreciated that when the diaphragm is forced downward with pressure against the inner surface 710 of the lower dome 214 the diaphragm may have a tendency to stick to the lower dome 214. In some circumstances, the diaphragm may become damaged when it pulls or rips off the surface of the lower dome 214. If the diaphragm seals to the lower dome 214, it can also cause unwanted pressure spikes (e.g., upwards of 40-60 psi) which can cause damage to external devices such as pumps or piping. This can occur if the tank 210 has been sitting idle in storage, during initial installation, or if the tank 210 is unused or empty. Therefore, it is desirable to provide a tank 210 that prevents or mitigates unwanted sticking or sealing of the diaphragm to the lower dome 214. As shown, the radial rib features 700 can be provided to break up surface area on the lower dome 214 so that the diaphragm has less surface area to adhere to, thereby mitigating a seal between the diaphragm and the lower dome 214. In other words, the rib features 700 can reduce sticking of the diaphragm to the tank wall.

To provide a pathway for fluid to exit the output 704 of the tank 210, a plurality of pass-throughs 712*a-d* can be provided. The pass-throughs 712*a-d* can provide a pathway for fluid to exit the tank 210 when the diaphragm abuts a surface of the lower dome 214. Namely, when the diaphragm abuts the lower dome 214 and the radial rib features 700, fluid may be prevented from exiting the tank 210 without the pass-throughs 712*a-d*. Therefore, pass-throughs 712*a-d* can be beneficial to ensure proper flow during initial pressurization or filling of the tank 210. Although FIGS. 15 and 16 are illustrated with four (4) pass-throughs 712*a-d*, it is understood that any number of pass-throughs can be provided to achieve a desired amount of flow.

A turbulator 748 can also be provided proximate the outlet 704. The turbulator 748 can be provided with smaller openings to ensure that the diaphragm does not extrude through the holes of the turbulator 748. The design of the turbulator 748 can also provide more directional fluid flow to ensure contact with the sidewall of the various tank or attachment components. This can be accomplished by slicing the water stream into multiple smaller streams or by maintaining a tighter vein flow pattern of the water. One skilled in the art will recognize that the turbulator 748 can include design modifications to change the flow of liquid through the turbulator 748 as desired.

The aforementioned systems, components, (e.g., tanks, stands, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

While the embodiments discussed herein have been related to the apparatus, systems and methods discussed above, these embodiments are intended to be exemplary and are not intended to limit the applicability of these embodiments to only those discussions set forth herein.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms “including”, “includes”, “having”, “has”, “with”, or variants thereof are used in the detailed description and/or in the claims, such terms are intended to be inclusive in a manner similar to the term “comprising.”

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms “a”, “an” and “the” include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as “about” is not to be limited to the precise value specified. In some instances, the approximating language may correspond to the precision of an instrument for measuring the value. Moreover, unless specifically stated otherwise, a use of the terms “first,” “second,” etc., do not denote an order or importance, but rather the terms “first,” “second,” etc., are used to distinguish one element from another.

As used herein, the terms “may” and “may be” indicate a possibility of an occurrence within a set of circumstances; a possession of a specified property, characteristic or function; and/or qualify another verb by expressing one or more of an ability, capability, or possibility associated with the qualified verb. Accordingly, usage of “may” and “may be” indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms “may” and “may be.”

The best mode for carrying out the invention has been described for purposes of illustrating the best mode known to the applicant at the time and enable one of ordinary skill in the art to practice the invention, including making and using devices or systems and performing incorporated methods. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A tank assembly comprising:

a tank comprising:

a polymeric body having a first end and second end;

a neck proximate the first or the second end of the polymeric body defining a through passage in communication with a cavity of the tank, and a connection attached to the polymeric body in the through passage of the neck, the connection having a groove proximate the second end of the connection and a through passage extending from a first end to a second end of the connection, the through passage comprising threads along an inner surface thereof for connection of at least one attachment, wherein the connection comprises a radially inwardly extending flange proximate the first end, the flange extending radially inward beyond a surface of the threads; and an attachment connected to the connection, the attachment comprising radially outwardly extending threads to engage the threads of the connection, wherein the attachment further comprises a lip proximate a first end of the attachment, the lip abuts a surface of the flange when the attachment is fully connected to the connection to prevent any further movement of the attachment towards the connection, wherein a seal is held in the groove of the connection between a surface of the connection and a surface of the attachment.

2. The tank assembly according to claim 1, wherein the attachment comprises an annular groove extending around a perimeter of the first end, the annular groove forming a void between a surface of the attachment and a surface of the connection.

3. The tank assembly according to claim 2, wherein a seal is held in the annular groove of the attachment to form a seal between the attachment and the connection.

4. The tank assembly according to claim 1, wherein the polymeric body comprises a polymeric lower dome, a polymeric upper dome, and a polymeric shell, wherein the polymeric upper dome, the polymeric lower dome, and the polymeric shell define a cavity of the tank.

5. The tank assembly according to claim 4, wherein the tank further comprises a flexible diaphragm disposed in the cavity of the tank, the diaphragm being connected to an inner wall of the polymeric shell.

6. The tank assembly according to claim 5, wherein the polymeric lower dome comprises a plurality of radial ribs configured to mitigate adhesion of the diaphragm to an inner surface of the lower dome.

7. A tank assembly comprising:

a tank including:

a polymeric body defining a cavity and a lower neck defining a through passage in communication with the cavity, a water attachment rotatably attached to the lower neck; and a support stand for supporting the tank and the water attachment is removeably attached to the support stand, wherein the support stand comprises at least two snap features located at a first end of the support stand proximate the lower neck of the polymeric body, the at least two snap features configured to engage a corresponding at least two flats of the polymeric body such that the snap features allow the support stand to rotate about the polymeric body in a first direction, but hinder rotation a second direction and prevent rotation of the support stand in the second direction with respect to the tank, wherein the at least two snap features are flexible with respect to the at least two flats when the support stand is rotated in the first direction such that the support stand can be rotated with respect to the tank.

8. The tank assembly of claim 7, wherein the support stand is installed to a first end of the polymeric body by rotating the support stand in the first direction to screw the support stand onto the tank.

9. The tank assembly of claim 7, wherein the water attachment and support stand are installed to a first end of the polymeric body by rotating the support stand in the first direction to screw the support stand onto the tank and to screw the water attachment to the lower neck.

10. The tank assembly of claim 7, wherein a greater rotational force is required to rotate the support stand in the second direction than the first direction.

11. The tank assembly according to claim 7, wherein the polymeric body includes a polymeric upper dome having an upper neck, a polymeric lower dome having the lower neck, and a polymeric shell having a first end connected to the upper dome and a second end connected to the lower dome.

12. The tank assembly according to claim 11, wherein the tank further comprises a flexible diaphragm disposed in the cavity of the tank, the diaphragm being connected to an inner wall of the polymeric shell.

13. The tank assembly according to claim 12, wherein the polymeric lower dome comprises a plurality of radial ribs configured to mitigate adhesion of the diaphragm to an inner surface of the lower dome.

14. A tank assembly comprising:

a tank comprising:

a polymeric body having a first end and second end;

a neck proximate the first or the second end of the polymeric body defining a through passage in communication with a cavity of the tank, and a connection attached to the polymeric body in the through passage of the neck, the connection having a through passage extending from a first end to a second end of the connection, the through passage comprising threads along an inner surface thereof for connection of at least one attachment, wherein the connection comprises a radially inwardly extending flange proximate the first end of the connection, the flange extending radially inward beyond a surface of the threads; and an attachment connected to the connection, the attachment comprising radially outwardly extending threads to engage the threads of the connection, a lip proximate a first end of the attachment, the lip abutting a surface of the flange when the attachment is fully connected to the connection to prevent any further movement of the attachment towards the connection, and an annular groove extending around a perimeter of the first end, the annular groove forming a void between a surface of the attachment and a surface of the connection.

15. The tank assembly according to claim 14, wherein a seal is held in the annular groove of the attachment to form a seal between the attachment and the connection.

16. The tank assembly according to claim 14, wherein the connection comprises a groove proximate the second end of the connection.

17. The tank assembly according to claim 14, wherein the polymeric body comprises a polymeric lower dome, a polymeric upper dome, and a polymeric shell, wherein the polymeric upper dome, the polymeric lower dome, and the polymeric shell define a cavity of the tank.

18. The tank assembly according to claim 17, wherein the tank further comprises a flexible diaphragm disposed in the cavity of the tank, the diaphragm being connected to an inner wall of the polymeric shell.

19. The tank assembly according to claim 18, wherein the polymeric lower dome comprises a plurality of radial ribs configured to mitigate adhesion of the diaphragm to an inner surface of the lower dome.

* * * * *